United States Patent

Bagepalli et al.

[11] Patent Number: 5,941,685
[45] Date of Patent: Aug. 24, 1999

[54] BRUSH SEAL FOR USE ON BUMPY ROTATING SURFACES

[75] Inventors: Bharat Sampathkumaran Bagepalli, Niskayuna; Norman Arnold Turnquist, Cobleskill; Christopher Edward Wolfe, Niskayuna, all of N.Y.

[73] Assignee: General Electric Company, Schenectady, N.Y.

[21] Appl. No.: 08/950,082

[22] Filed: Oct. 14, 1997

[51] Int. Cl.$^6$ ..................................................... F01D 11/08
[52] U.S. Cl. .................................. 415/173.3; 415/173.5; 277/355
[58] Field of Search ............................. 415/173.3, 173.5, 415/174.2, 174.5, 231; 277/355

[56] References Cited

U.S. PATENT DOCUMENTS

| | | | |
|---|---|---|---|
| 4,202,554 | 5/1980 | Snell | 277/355 |
| 5,474,306 | 12/1995 | Bagepalli et al. | |
| 5,613,829 | 3/1997 | Wolfe et al. | |

FOREIGN PATENT DOCUMENTS

| | | | |
|---|---|---|---|
| 6-93803 | 4/1994 | Japan | 415/173.5 |
| 1417969 | 12/1975 | United Kingdom | 277/355 |

OTHER PUBLICATIONS

Bagepalli et al., "Brush Seals and Combined Labyrinth and Brush Seals for Rotary Machines", S.N. 08/855,013, filed May 13, 1997.

Wolfe et al., "Brush Seal for Use on Rough Rotating Surfaces", S.N. 08/942,887; filed Oct. 2, 1997.

Bagepalli et al., "Brush Seals and Combined Labyrinth and Brush Seals for Rotary Machines", S.N. 08/672,665, filed May 23, 1996.

Bagepalli et al., "Method for Making a Brush Seal", S.N. 08/425,008, Apr. 17, 1995.

Hendriks et al., "Integrity Testing of Brush Seal in Shroud Ring of T–700 Engine", presented at the International Gas Turbine and Aeroengine Congress and Exposition, May 24–27, 1993, Cincinnati, Ohio.

*Primary Examiner*—Christopher Verdier
*Attorney, Agent, or Firm*—Douglas E. Erickson; Marvin Snyder

[57] ABSTRACT

A brush seal which, among other applications, may be used for sealing a steam leakage gap between the shrouded free end of steam-turbine buckets of a steam-turbine rotor and a circumferentially surrounding steam-turbine stator. In a first embodiment, an unflexed brush seal includes bristles having a generally straight first portion secured to a backing plate and a coextensive and generally straight second portion with a free end. The second portion makes a greater angle, than that of the first portion, with respect to a directed reference line. In a second embodiment, the first and second portions are curved, wherein a tangent line to the second portion makes a greater angle than a tangent line to the first portion.

19 Claims, 4 Drawing Sheets

BRUSH SEAL FOR USE ON BUMPY ROTATING SURFACES

FIELD OF THE INVENTION

The present invention relates generally to brush seals, and more particularly to a brush seal for use on bumpy rotating surfaces.

BACKGROUND OF THE INVENTION

Brush seals are used to minimize leakage through a gap between two components, wherein such leakage is from a higher pressure area to a lower pressure area. Brush seals have been used, or their use proposed, in rotating machinery. Such use includes, but is not limited to, turbomachinery including steam turbines and gas turbines used for power generation and gas turbines used for aircraft and marine propulsion. It is noted that brush seals minimize the leakage of steam in steam turbines and minimize the leakage of compressed air or combustion gases in gas turbines.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotating tips of the turbine or compressor rotor blades and the circumferentially surrounding turbine or compressor casing, will lower the efficiency of the gas turbine leading to increased fuel costs. Also, steam-path leakage in the turbine area of a steam turbine, between the rotating tips of the buckets (i.e., blades) and the circumferentially surrounding casing, will lower the efficiency of the steam turbine leading to increased fuel costs.

Conventional brush seal designs have been proposed for use in such applications. The brush seals have wire or ceramic bristles conventionally welded or otherwise affixed to a backing plate. To improve performance, such brush seals typically align their wire bristles to contact the rotating tips of the blades/buckets at an angle between generally forty-five and generally sixty degrees with respect to a radius line from the center of the rotor to the point of bristle contact. However, the rotating tips of the blades/buckets typically present a bumpy surface since circumferentially adjacent blades/buckets typically are of slightly different radial lengths, such differences being sensed as bumps by the bristles. Such bumps cut and unevenly wear the free end of the bristles which results in poor sealing. It is noted that increasing the previously-described angle of the bristles beyond generally sixty degrees results in a very long bristle which is too flexible to provide good sealing.

What is needed is an improved brush seal which will maintain its sealing qualities even when used against bumpy rotating surfaces such as the shrouded free ends of gas turbine blades or steam turbine buckets.

SUMMARY OF THE INVENTION

In a first preferred embodiment, the brush seal of the invention includes a brush-seal backing plate and monolithic and generally identical bristles. The backing plate has opposing first and second edges. The bristles each have a first portion and a second portion which is coextensive with the first portion. The following statements describe a same one of the bristles in an unflexed state. The first portion is generally straight, the second portion is generally straight, and the first portion and the second portion together generally lie in a plane. The first portion is attached to the backing plate, and the second portion has a free end overhanging the second edge. The first portion extends from the second edge, in a direction away from the first edge, at a non-negative first angle with respect to a directed reference line. The second portion, in a direction towards the free end, makes a positive second angle with respect to the directed reference line. The second angle is greater than the first angle.

Preferably, the first preferred brush seal is for generally sealing a leakage gap between a rotor and a circumferentially-surrounding stator. The backing plate is attached to the stator. The free end of the second portion extends towards and makes contact with the rotor (and preferably the shrouded free end of the blades of the rotor).

In a second preferred embodiment, the brush seal of the invention includes a brush-seal backing plate and monolithic and generally identical bristles. The backing plate has opposing first and second edges. The bristles each have a first portion and a second portion which is coextensive with the first portion. The following statements describe a same one of the bristles in an unflexed state. The first portion is curved, the second portion is curved, and the first portion and the second portion together generally lie in a plane. The first portion is attached to the backing plate, and the second portion has a free end overhanging the second edge. The first portion, at a point proximate the second edge, has a first tangent line which extends from proximate the second edge, in a direction away from the first edge, at a non-negative first angle with respect to a directed reference line. The second portion, at a point proximate the free end, has a second tangent line which extends from proximate the free end, in a direction away from the first edge, at a positive second angle with respect to the directed reference line. The second angle is greater than the first angle.

Preferably, the second preferred brush seal is for generally sealing a leakage gap between a rotor and a circumferentially-surrounding stator. The backing plate is attached to the stator. The free end of the second portion extends towards and makes contact with the rotor (and preferably the shrouded free end of the blades of the rotor).

Several benefits and advantages are derived from the invention. In the first and second preferred brush seals, the first portion of the bristles has a smaller angle (or tangent-line angles) which keeps the overall length of the bristles small enough to provide adequate bristle stiffness for good sealing. Meanwhile, the second portion of the bristles has a larger angle (or tangent-line angles) which permits the bristles to be lifted (instead of cut) by the bumps between the circumferentially adjacent blades/buckets, thus providing good sealing against a bumpy surface. Engineering analysis indicates the brush seal of the invention can result in a two-to-one reduction in gas or steam leakage which, in gas or steam turbines used for power generation, could result in savings of tens of thousands of dollars per year per turbine.

DETAILED DESCRIPTION OF THE INVENTION

Figure 1:
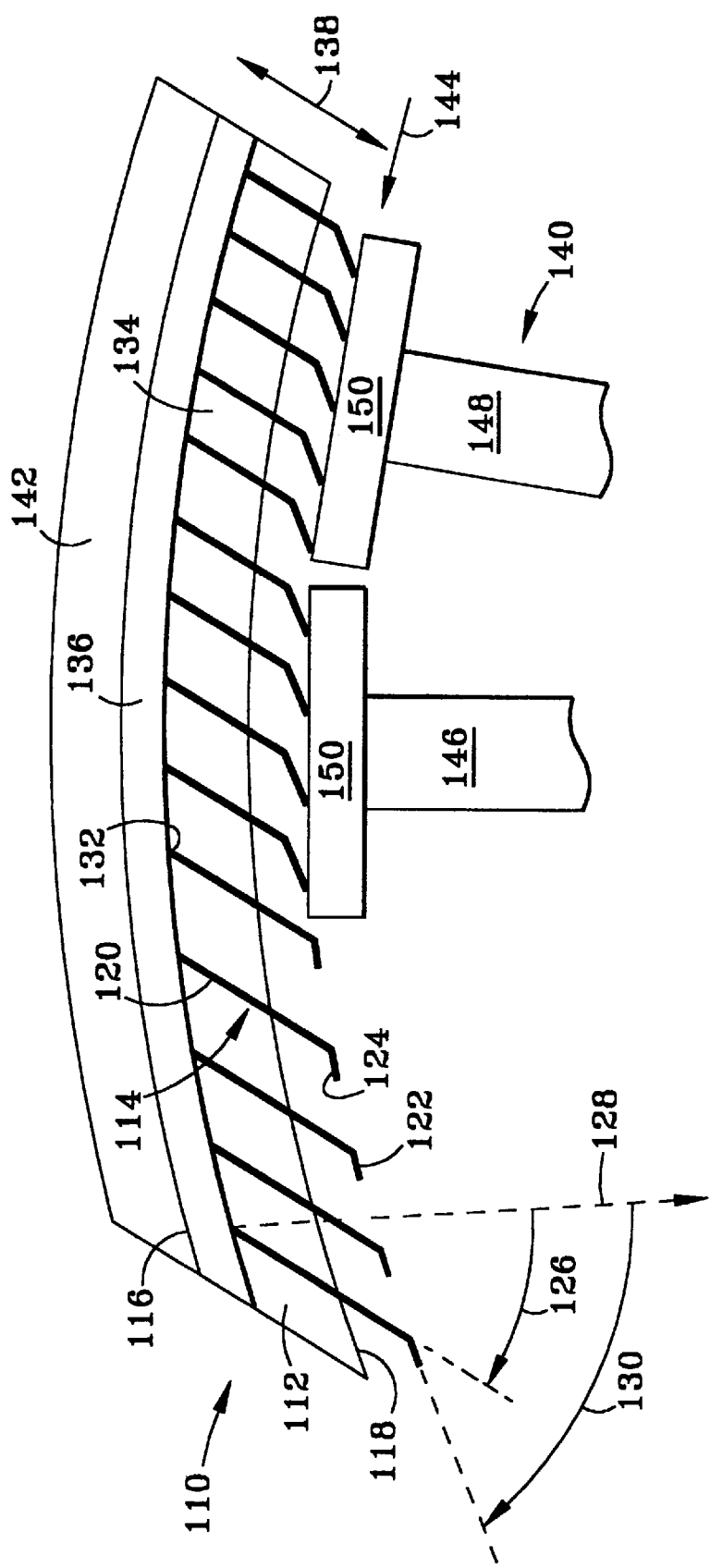
FIG. 1 is a schematic front elevational view of an annular segment of a first preferred embodiment of the brush seal of the present invention showing bristles having generally straight first and second sections together with a typical rotor-stator brush seal installation.
Figure 2:
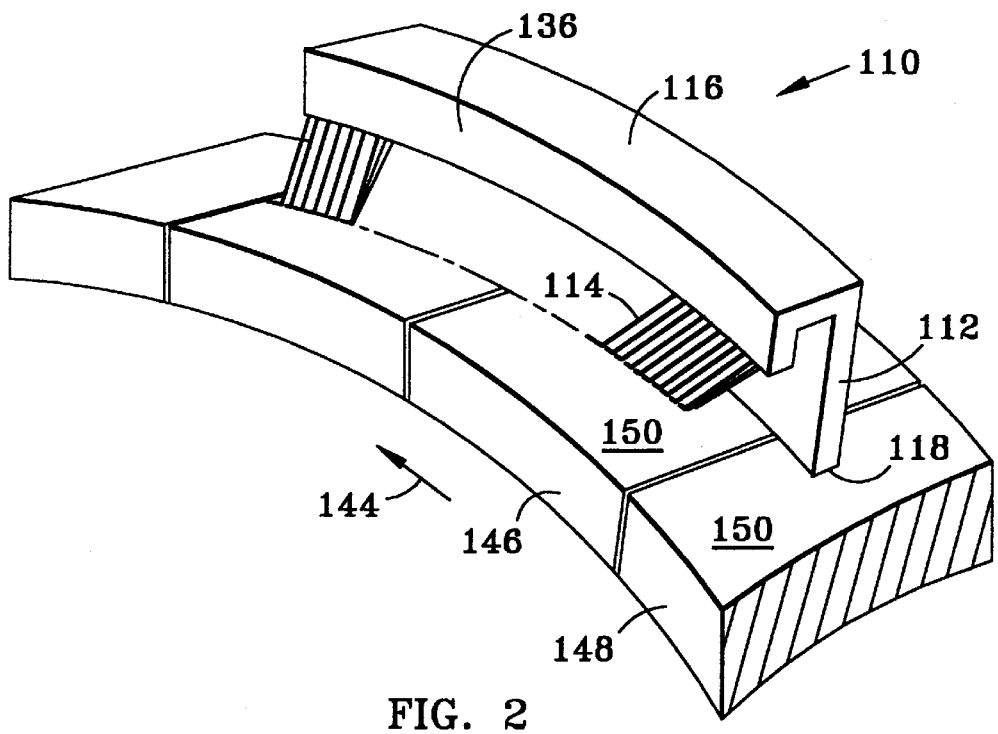
FIG. 2 is a perspective view of FIG. 1 with the stator omitted for clarity.
Figure 3:
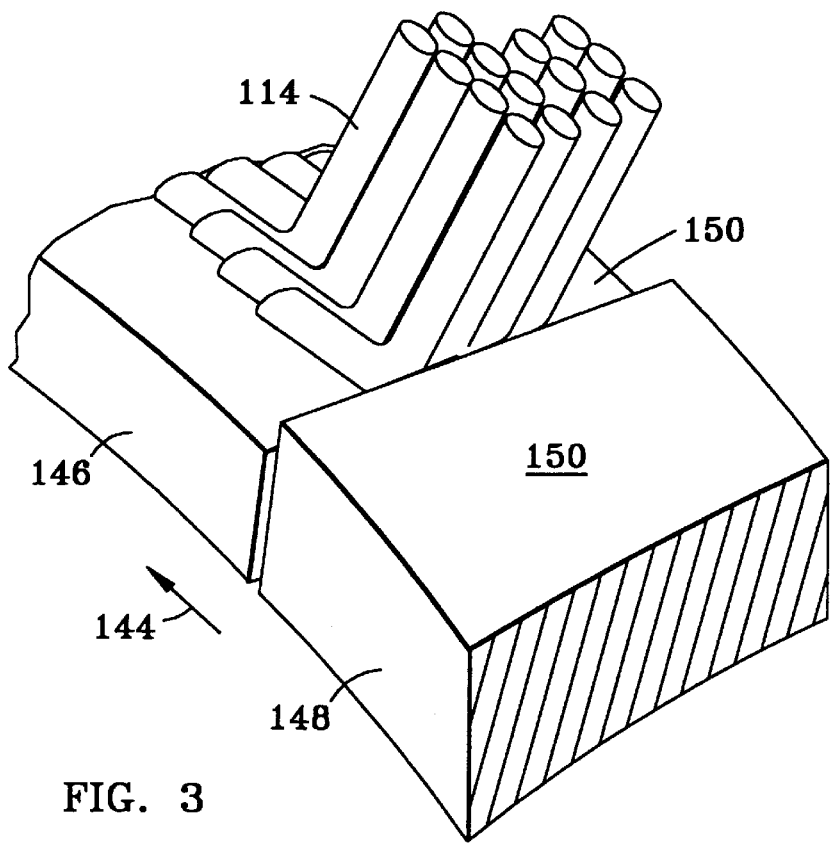
FIG. 3 is an exploded view of a portion of FIG. 2 showing some bristles in contact with a slightly shorter rotor blade before encountering the bump of the circumferentially-adjacent slightly longer rotor blade.
Figure 4:
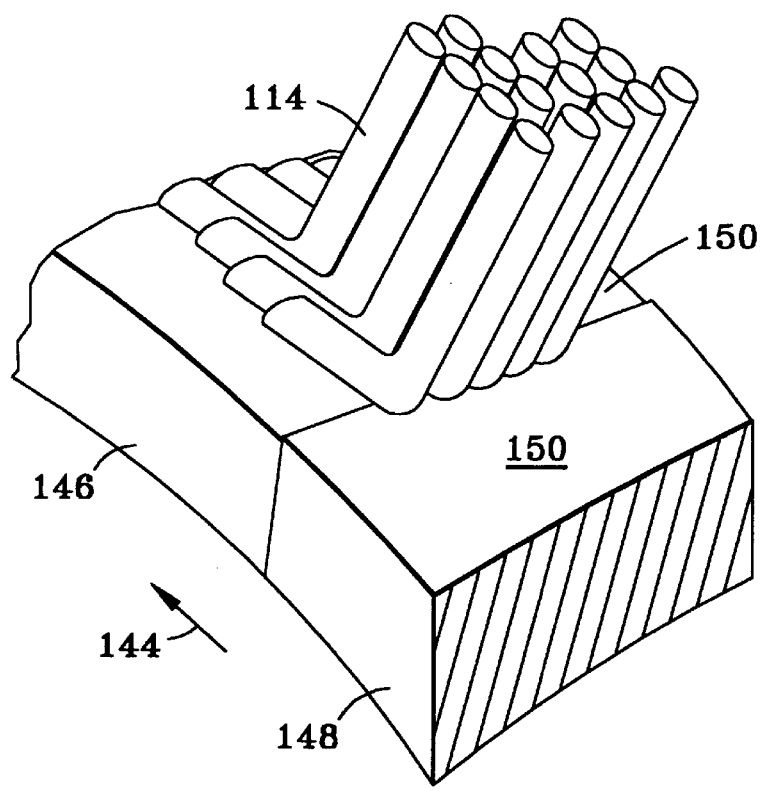
FIG. 4 is a view, as in FIG. 3, but of the same bristles being lifted (instead of being cut) by the bump.
Figure 5:
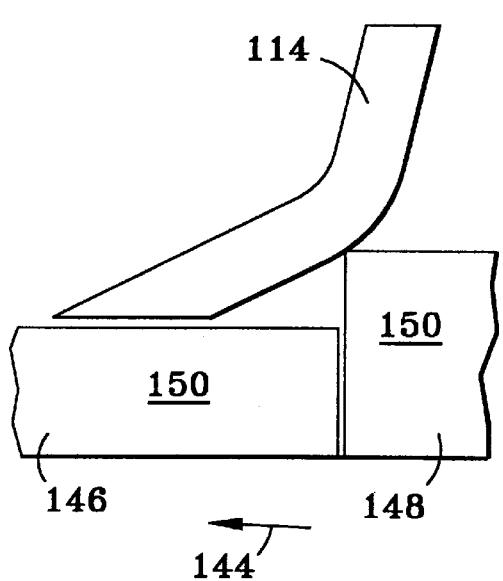
FIG. 5 is a schematic front elevational view of a single bristle of FIG. 3 and the rotor blades of FIG. 3.
Figure 6:
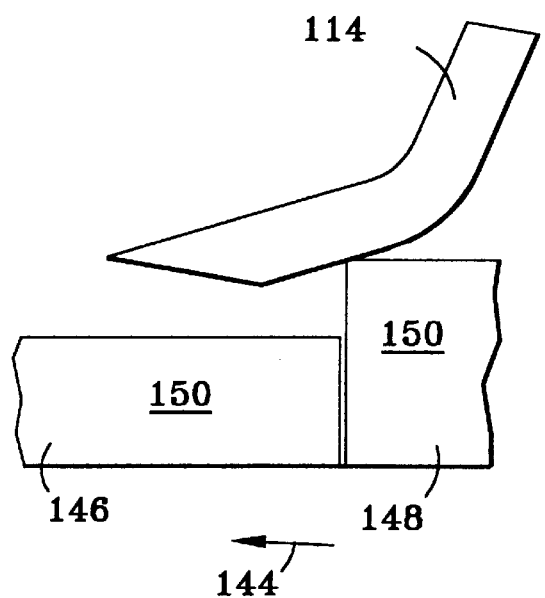
FIG. 6 is a schematic front elevational view of a single bristle of FIG. 4 and the rotor blades of FIG. 4.

Referring now to the drawings, FIGS. 1–6 schematically show a first preferred embodiment of the brush seal 110 of the present invention. The brush seal 110 includes a brush-seal backing plate 112 and a plurality of monolithic and generally identical bristles 114. The backing plate 112 has opposing first and second edges 116 and 118. The bristles 114 are described as monolithic bristles which, for the purposes of describing the invention, means that each bristle constitutes a single piece as opposed to each bristle constituting two or more joined pieces. The material makeup of the single piece is left to the artisan. Preferred materials for the bristles include coated or uncoated metal (including alloy) wire bristles and ceramic wire bristles.

The bristles 114 each have a first portion 120 and a second portion 122 which is coextensive with the first portion 120. Unless noted otherwise, statements made hereafter describing the bristles 114 refer to a same one of the bristles 114 in an unflexed state. The first portion 120 is generally straight, the second portion 122 is generally straight, and the first portion 120 and the second portion 122 together generally lie in a plane. The first portion 120 is attached to the backing plate 112, and the second portion 122 has a free end 124 overhanging the second edge 118. The first portion 120 extends from the second edge 118, in a direction away from the first edge 116, at a non-negative first angle 126 with respect to a directed reference line 128. The second portion 122, in a direction towards the free end 124, makes a positive second angle 130 with respect to the directed reference line 128. The second angle 130 is greater than the first angle 126. It is noted that a directed reference line is a reference line that has a direction.

Preferably, the first portion 120 has a secured end 132 attached to the backing plate 112 proximate the first edge 116, and the second portion 122 is immediately adjacent, and extends from, the first portion 120. It is noted that although each bristle generally lies in a plane, the planes of most bristles typically are different. The first portion 120 has a first length, the second portion 122 has a second length, and preferably the first length is greater than the second length. The backing plate 112 can have any shape including, without limitation, a straight or curved shape. In an exemplary construction, the backing plate 112 is a segment 134 of an annular ring, and the directed reference line 128 extends in a fixed and negative radial direction (i.e., in a fixed direction towards the center of the annular ring). Preferably, the first angle 126 is between generally thirty degrees and generally sixty degrees, and the second angle 130 is between generally thirty-one degrees and generally eighty degrees.

It is understood that, in describing the present brush seal invention, when a first part is described as being attached to a second part, such first part may be directly or indirectly attached to such second part. For metal wire bristles 114, the attachment of the secured end 132 of the first portion 120 of the bristles 114 to the backing plate 112 preferably is accomplished by welding. A brush seal typically also has a front plate (shown in FIGS. 1 and 2 as an overhang portion 136 of the backing plate 112) wherein the secured end 132 of the first portion 120 of the bristles 114 is captured between the backing plate 112 and the front plate (e.g., overhang portion 136).

In a preferred application, as shown in the bush seal installation of FIGS. 1–6, the brush seal 110 of the invention is for generally sealing a leakage gap 138 between a rotor 140 and a circumferentially-surrounding stator 142, wherein the rotor 140 undergoes rotation. Only a portion of the stator 142 is shown in FIG. 1, and only a portion of the rotor 140 is shown in FIGS. 1–6. Preferably, the leakage gap is a steam-leakage gap or a gas-leakage gap wherein the word "gas" includes compressed air or combustion gas.

The backing plate 112 is disposed in the leakage gap 138, is attached to the stator 142, and is spaced-apart from the rotor 140. The direction of rotation of the rotor 140 is indicated by arrow 144. The free end 124 of the second portion 122 of the bristles 114 extends towards and makes contact with the rotor 140.

In a preferred construction, the rotor 140 has a circumferential row of generally identical blades 146 and 148 (only two of which are shown in FIGS. 1–6) each having a shrouded free end 150. The free end 124 of the second portion 122 of the bristles 114 makes contact with the shrouded free end 150 of the blades 146 and 148 of the circumferential row. The difference in length between a shortest blade 146 and a longest blade 148 of the blades 146 and 148 of the circumferential row is a predetermined tolerance. The second portion 122 of the bristles 114 is long enough such that only the second portion 122 of the bristles 114 contacts the shrouded free end 150 of the blades 146 and 148 of the circumferential row despite the predetermined tolerance. In a favored installation, the stator 142 is a turbine casing and preferably a steam turbine casing, the rotor 140 is a turbine rotor and preferably a steam turbine rotor, the leakage gap 138 is a steam-leakage gap, and the blades 146 and 148 are steam-turbine buckets. It is noted that FIG. 1 shows some bristles in an unflexed state (i.e., those bristles 114 which are shown to the left of the shrouded free end 150 of blade 146).

Figure 7:
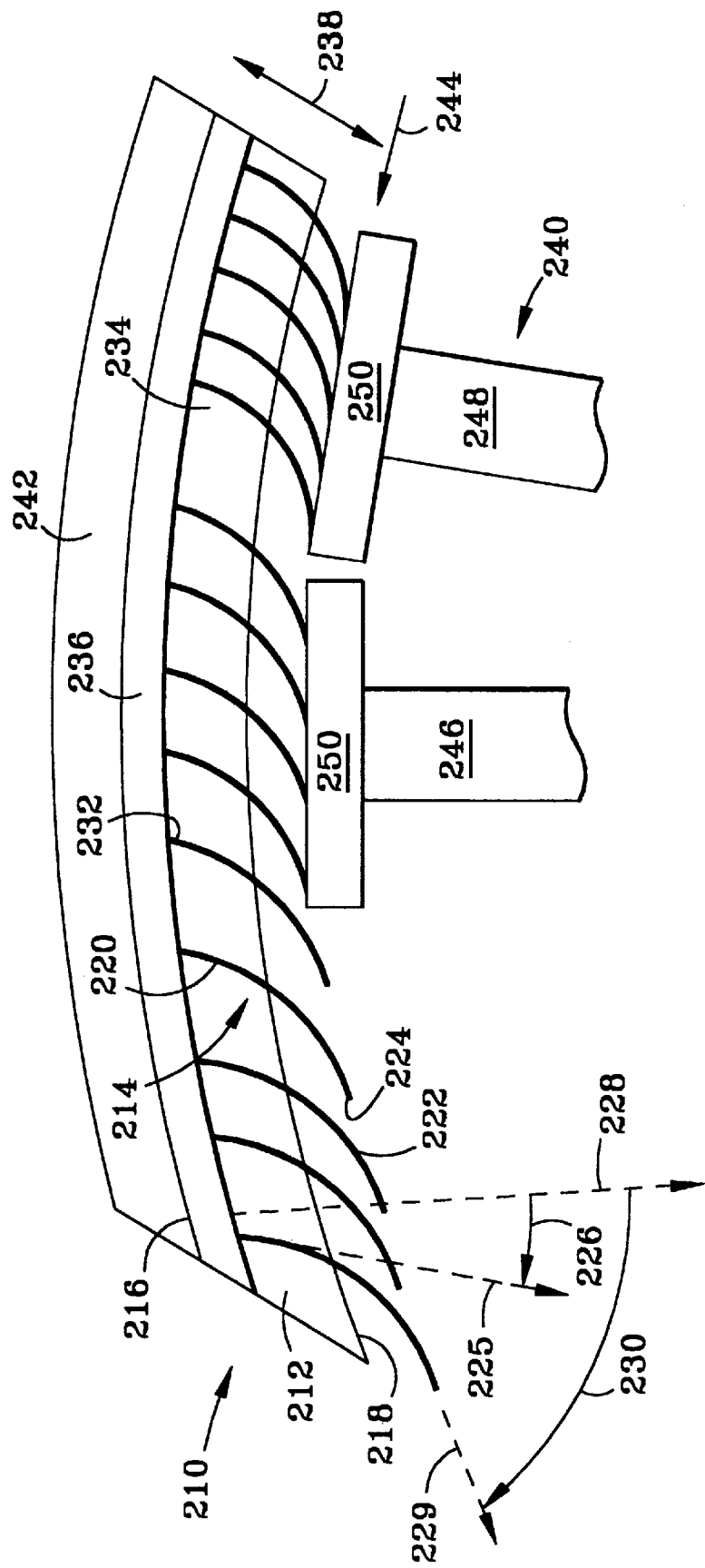
FIG. 7 is a view, as in FIG. 1, but of a second preferred embodiment of the brush seal of the present invention showing bristles having curved first and second sections together with a typical rotor-stator brush seal installation.

Referring again to the drawings, FIG. 7 schematically shows a second preferred embodiment of the brush seal 210 of the present invention. The brush seal 210 includes a brush-seal backing plate 212 and a plurality of monolithic and generally identical bristles 214. The backing plate 212 has opposing first and second edges 216 and 218. The bristles 214 are described as monolithic bristles which, for the purposes of describing the invention, means that each bristle constitutes a single piece as opposed to each bristle constituting two or more joined pieces. The material makeup of the single piece is left to the artisan. Preferred materials for the bristles include coated or uncoated metal (including alloy) wire bristles and ceramic wire bristles.

The bristles 214 each have a first portion 220 and a second portion 222 which is coextensive with the first portion 220. Unless noted otherwise, statements made hereafter describing the bristles 214 refer to a same one of the bristles 214 in an unflexed state. The first portion 220 is curved, the second portion 222 is curved, and the first portion 220 and the second portion 222 together generally lie in a plane. The first portion 220 is attached to the backing plate 212, and the second portion 222 has a free end 224 overhanging the second edge 218. The first portion 220, at a point proximate the second edge 218, has a first tangent line 225 which extends from proximate the second edge 218, in a direction away from the first edge 216, at a non-negative first angle 226 with respect to a directed reference line 228. The second portion 222, at a point proximate the free end 224, has a second tangent line 229 which extends from proximate the free end 224, in a direction away from the first edge 216, at a positive second angle 230 with respect to the directed reference line 228. The second angle 230 is greater than the first angle 226. It is noted that a directed reference line is a reference line that has a direction.

Preferably, the first portion 220 has a secured end 232 attached to the backing plate 212 proximate the first edge 216, and the second portion 222 is immediately adjacent, and extends from, the first portion 220. It is noted that although each bristle generally lies in a plane, the planes of most bristles typically are different. In an exemplary design, a perpendicular dropped from one of the bristles 214, in the unflexed state, to the directed reference line 228 continuously increases in length as one moves alone the one bristle, in the unflexed state, from proximate the second edge 218 to proximate the free end 224. The backing plate 212 can have any shape including, without limitation, a straight or curved shape. In an exemplary construction, the backing plate 212 is a segment 234 of an annular ring, and the directed reference line 228 extends in a fixed and negative radial direction (i.e., in a fixed direction towards the center of the annular ring). Preferably, the first angle 226 is between generally thirty degrees and generally sixty degrees, and the second angle 230 is between generally thirty-one degrees and generally eighty degrees.

It is understood that, in describing the present brush seal invention, when a first part is described as being attached to a second part, such first part may be directly or indirectly attached to such second part. For metal wire bristles 214, the attachment of the secured end 232 of the first portion 220 of the bristles 214 to the backing plate 212 preferably is accomplished by welding. A brush seal typically also has a front plate (shown in FIG. 7 as an overhang portion 236 of the backing plate 212) wherein the secured end 232 of the first portion 220 of the bristles 214 is captured between the backing plate 212 and the front plate (e.g., overhang portion 236).

In a preferred application, as shown in the bush seal installation of FIG. 7, the brush seal 210 of the invention is for generally sealing a leakage gap 238 between a rotor 240 and a circumferentially-surrounding stator 242, wherein the rotor 240 undergoes rotation. Only a portion of the rotor 240 and the stator 242 is shown in FIG. 7. Preferably, the leakage gap is a steam-leakage gap or a gas-leakage gap wherein the word "gas" includes compressed air or combustion gas.

The backing plate 212 is disposed in the leakage gap 238, is attached to the stator 242, and is spaced-apart from the rotor 240. The direction of rotation of the rotor 240 is indicated by arrow 244. The free end 224 of the second portion 222 of the bristles 214 extends towards and makes contact with the rotor 240.

In a preferred construction, the rotor 240 has a circumferential row of generally identical blades 246 and 248 (only two of which are shown in FIG. 7) each having a shrouded free end 250. The free end 224 of the second portion 222 of the bristles 214 makes contact with the shrouded free end 250 of the blades 246 and 248 of the circumferential row. In a favored installation, the stator 242 is a turbine casing and preferably a steam turbine casing, the rotor 240 is a turbine rotor and preferably a steam turbine rotor, the leakage gap 238 is a steam-leakage gap, and the blades 246 and 248 are steam-turbine buckets. It is noted that FIG. 7 shows some bristles in an unflexed state (i.e., those bristles 214 which are shown to the left of the shrouded free end 250 of blade 246).

In both the first and second preferred embodiments of the brush seal 110 and 210 of the present invention, the bumpy surface encountered by the free end 124 and 224 of the second portion 122 and 222 of the bristles 114 and 214 is the circumferential row of slightly-unequal-length blades 146 & 148 and 246 & 248. With a conventional brush seal, the bristles would be cut and/or unevenly worn by each bump. With the design of the brush seal 110 and 210 of the present invention, the bristles 114 and 214 will be lifted (and not cut or unevenly worn) by the bump because of the reduced frictional resistance (due to a shallow angle of attack of the bristles) at the bump-bristle interface.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal comprising:
  a) a brush-seal backing plate having opposing first and second edges; and
  b) a plurality of monolithic and generally identical bristles each having a first portion and a second portion which is coextensive with said first portion, and for a same one of said bristles in an unflexed state: wherein said first portion is generally straight, said second portion is generally straight, and said first portion and said second portion together generally lie in a plane; wherein said first portion is attached to said backing plate and said second portion has a free end overhanging said second edge; wherein said first portion extends from said second edge, in a direction away from said first edge, at a non-negative first angle with respect to a directed reference line; wherein said second portion, in a direction towards said free end, makes a positive second angle with respect to said directed reference line; and wherein said second angle is greater than said first angle.

2. The brush seal of claim 1, wherein said second portion is immediately adjacent, and extends from, said first portion.

3. The brush seal of claim 2, wherein said first portion has a first length, wherein said second portion has a second length, and wherein said first length is greater than said second length.

4. The brush seal of claim 3, wherein said backing plate is a segment of an annular ring, and wherein said directed reference line extends in a fixed and negative radial direction.

5. The brush seal of claim 4, wherein said first angle is between generally thirty degrees and generally sixty degrees, and wherein said second angle is between generally thirty-one degrees and generally eighty degrees.

6. The brush seal of claim 5, wherein said first portion has a secured end attached to said backing plate proximate said first edge.

7. The brush seal of claim 1 for generally sealing a leakage gap between a rotor and a circumferentially-surrounding stator, wherein said backing plate is attached to said stator, and wherein said free end of said second portion extends towards and makes contact with said rotor.

8. The brush seal of claim 7, wherein said rotor has a circumferential row of generally identical blades each having a shrouded free end, wherein the difference in length between a shortest blade and a longest blade of said blades of said circumferential row is a predetermined tolerance, wherein said free end of said second portion makes contact with said shrouded free end of said blades of said circumferential row; and wherein said second portion is long enough such that only said second portion contacts said shrouded free end of said blades of said circumferential row despite said predetermined tolerance.

9. The brush seal of claim 8, wherein said stator is a turbine casing and said rotor is a turbine rotor.

10. The brush seal of claim 9, wherein said leakage gap is a steam-leakage gap, wherein said turbine casing is a steam turbine casing, wherein said turbine rotor is a steam turbine rotor, and wherein said blades are steam-turbine buckets.

11. A brush seal comprising:
   a) a brush-seal backing plate having opposing first and second edges; and
   b) a plurality of monolithic and generally identical bristles each having a first portion and a second portion which is coextensive with said first portion, and for a same one of said bristles in an unflexed state: wherein said first portion is curved, said second portion is curved, and said first portion and said second portion together generally lie in a plane; wherein said first portion is attached to said backing plate and said second portion has a free end overhanging said second edge; wherein said first portion, at a point proximate said second edge, has a first tangent line which extends from proximate said second edge, in a direction away from said first edge, at a non-negative first angle with respect to a directed reference line; wherein said second portion, at a point proximate said free end, has a second tangent line which extends from proximate said free end, in a direction away from said first edge, at a positive second angle with respect to said directed reference line; wherein said second angle is greater than said first angle, wherein said backing plate is a segment of an annular ring, and wherein said directed reference line extends in a fixed and negative radial direction.

12. The brush seal of claim 11, wherein said second portion is immediately adjacent, and extends from, said first portion.

13. The brush seal of claim 12, wherein a perpendicular dropped from one of said bristles, in said unflexed state, to said directed reference line continuously increases in length as one moves along said one bristle, in said unflexed state, from proximate said second edge to proximate said free end.

14. The brush seal of claim 13, wherein said first angle is between generally thirty degrees and generally sixty degrees, and wherein said second angle is between generally thirty-one degrees and generally eighty degrees.

15. The brush seal of claim 14, wherein said first portion has a secured end attached to said backing plate proximate said first edge.

16. The brush seal of claim 11 for generally sealing a leakage gap between a rotor and a circumferentially-surrounding stator, wherein said backing plate is attached to said stator, and wherein said free end of said second portion extends towards and makes contact with said rotor.

17. The brush seal of claim 16, wherein said rotor has a circumferential row of generally identical blades each having a shrouded free end, and wherein said free end of said second portion makes contact with said shrouded free end of said blades of said circumferential row.

18. The brush seal of claim 17, wherein said stator is a turbine casing and said rotor is a turbine rotor.

19. The brush seal of claim 18, wherein said leakage gap is a steam-leakage gap, wherein said turbine casing is a steam turbine casing, wherein said turbine rotor is a steam turbine rotor, and wherein said blades are steam-turbine buckets.

* * * * *